June 18, 1963  C. SIEBRING ETAL  3,094,205
OVERHEAD CONVEYOR AND BUNK FEEDER
Filed Sept. 8, 1958  3 Sheets-Sheet 1
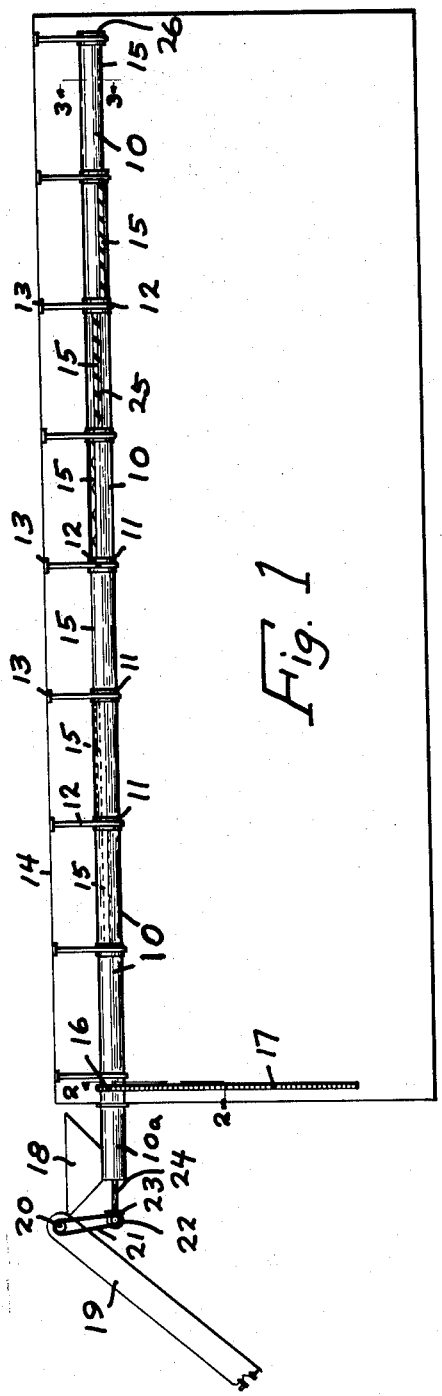
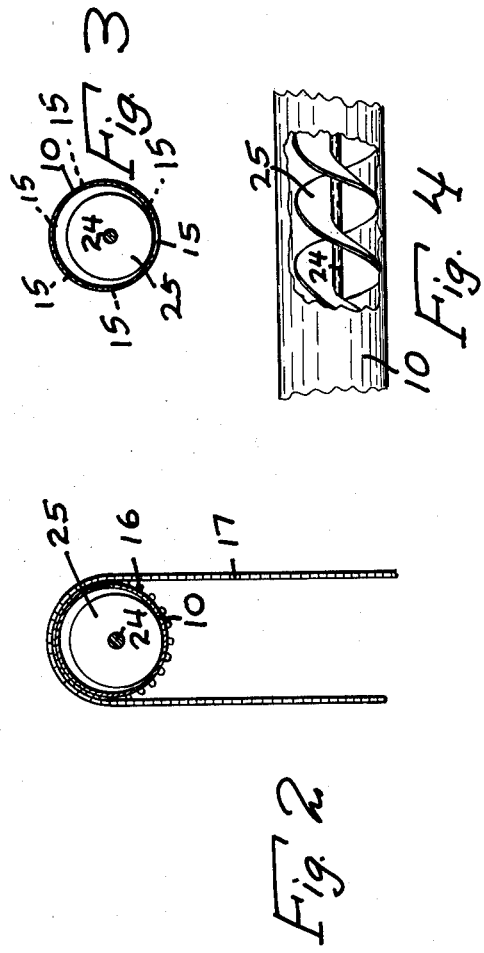
INVENTORS.
Claude Siebring
Owen Siebring
BY
ATTORNEY June 18, 1963 C. SIEBRING ETAL 3,094,205
OVERHEAD CONVEYOR AND BUNK FEEDER
Filed Sept. 8, 1958 3 Sheets-Sheet 2
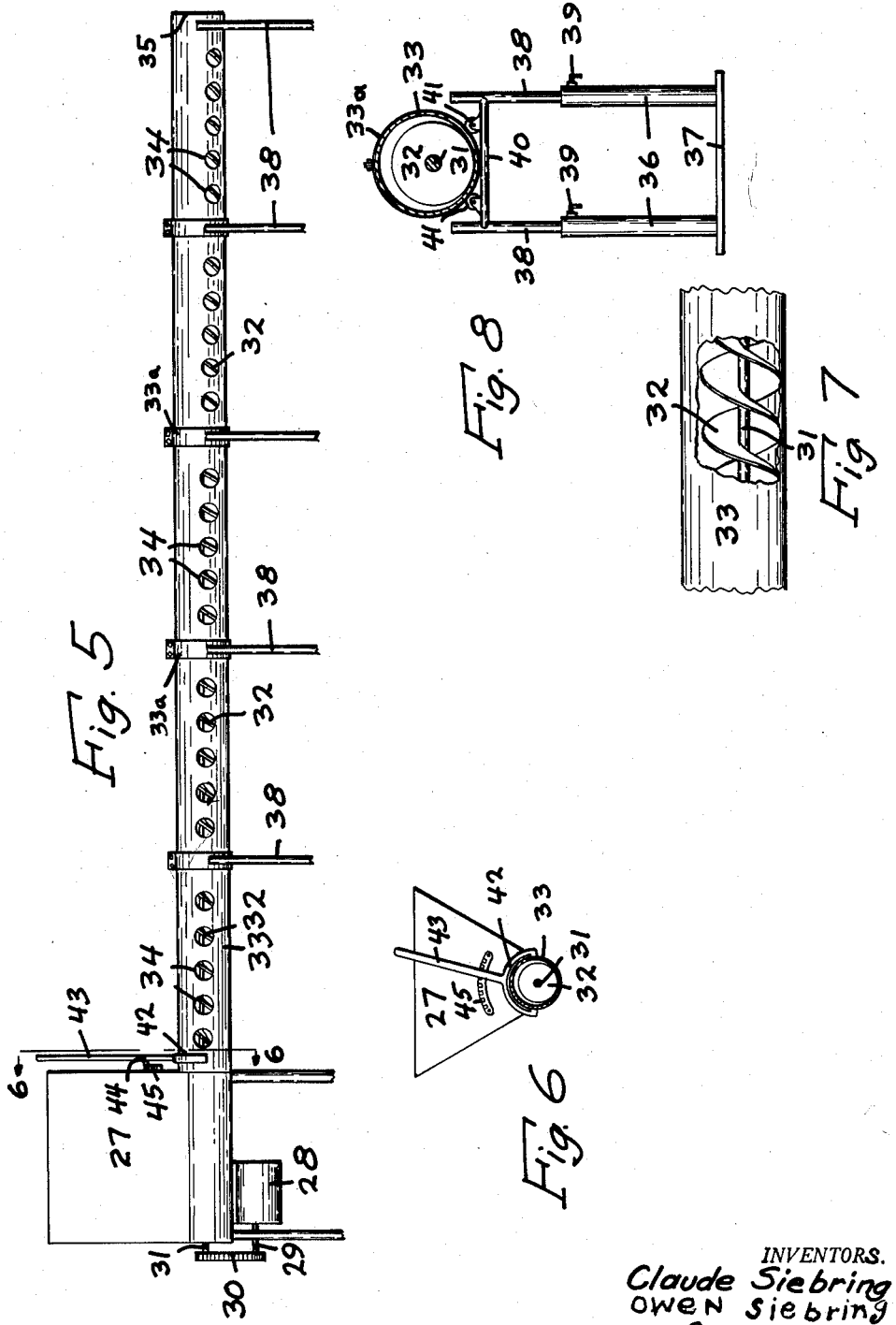
INVENTORS.
Claude Siebring
Owen Siebring
BY
ATTORNEY June 18, 1963 C. SIEBRING ETAL 3,094,205
OVERHEAD CONVEYOR AND BUNK FEEDER
Filed Sept. 8, 1958 3 Sheets-Sheet 3
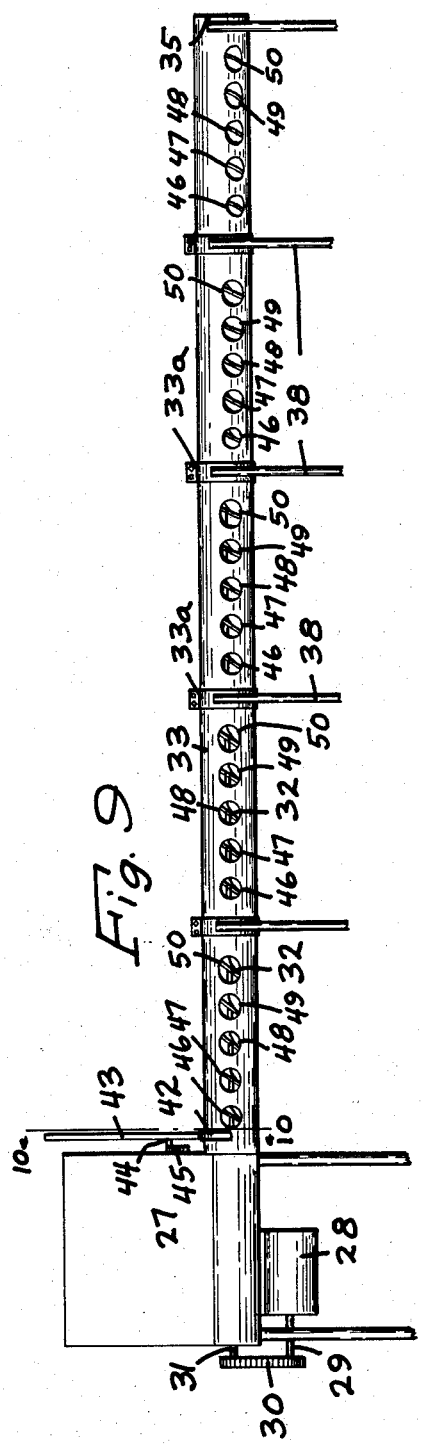
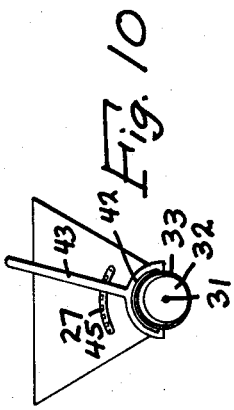
INVENTOR.
Claude Siebring
Owen Siebring
BY *Sam J. Slotsky*
ATTORNEY

United States Patent Office 3,094,205
Patented June 18, 1963

3,094,205
OVERHEAD CONVEYOR AND BUNK FEEDER
Claude Siebring and Owen Siebring,
George, Iowa
Filed Sept. 8, 1958, Ser. No. 759,492
4 Claims. (Cl. 198—64)

My invention relates to an overhead conveyor and bunk feeder.

An object of my invention is to provide an arrangement which can be used for the overhead filling of long buildings or could be alternatively used for filling bunks.

A further object of my invention is to provide a bunk feeder which will provide automatic feeding into the bunk and which feeding will be uniform.

A further object of my invention is to provide a bunk feeder which is relatively simple in construction and can be manufactured at a reasonable cost.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the overhead conveyor,

FIGURE 2 is an enlarged sectional view taken along the lines 2—2 of FIGURE 1,

FIGURE 3 is an enlarged sectional view taken along the lines 3—3 of FIGURE 1,

FIGURE 4 is an enlarged detail,

FIGURE 5 is a modification in elevation showing one form of the bunk feeder,

FIGURE 6 is a sectional view taken along the lines 6—6 of FIGURE 5,

FIGURE 7 is an enlarged detail,

FIGURE 8 is a further enlarged detail taken in section,

FIGURE 9 is a further elevation of a further modification of the bunk feeder, and FIGURE 10 is a sectional view taken along the lines 10—10 of FIGURE 9.

My invention relates to an overhead conveyor, however the principal objective of my invention is to provide a construction of bunk feeders which will feed bunks uniformly, etc.

In FIGURE 1 I have used the character 10 to designate a plurality of sections of tubing which are firmly secured within the bands 11, the bands 11 being cradled for rotation within the U-shaped brackets 12 which are secured at 13 to the top wall 14 of a long building which is to be filled with grain, etc., and I have further used the character 15 to indicate a series of openings which are arranged about the tubular sections 10, and are arranged progressively spirally around the sections 10 as they pass toward the forward end of the building as will be evident from both FIGURES 1 and 3.

Attached to one of the sections 10 is a sprocket 16 over which passes a sprocket chain 17 which is continuous, and attached to a foremost section 10a, which section is stationary, is a hopper 18 which is adapted to receive feed from the elevator 19 suitably driven, with the elevator 19 including an upper shaft 20 driving the chain 21, which in turn drives the bevel gear 22 which in turn drives the further bevel gear 23 which drives the shaft 24.

The shaft 24 is attached to a long helical conveyor 25 which rests within the tube sections 10 and which extends to the end 26 of the tubular sections 10.

It will now be noted that the lengthened building can be filled in the following manner.

First the rearmost section 10 which includes the opening 15 has this opening 15 (see FIGURES 1 and 3) lowermost. The conveyor 25 is actuated together with the elevator 19, and the grain thereby conveyed through the series of tubes 10 will be first dropped at the rear of the building through the opening 15, the other openings being at a higher level whereby practically very little or no grain will fall.

After the complete rear end of the building has been filled by this means, the chain 17 is then pulled slightly which will cause the sections 10 and bands 11 to rotate within the hangers 12 a slight distance until the next opening 15 from the rear will be positioned directly downwardly, whereupon the filling will take place in the next area in the building, and by merely rotating the structure slightly each time the building will be gradually uniformly filled to the front end, and it will be readily obvious that a similar construction and circumferentially spaced openings could be used in a bunk feeder as well, using the same principles.

FIGURE 5 illustrates a modification wherein the structure described pertains to bunk feeding only and in this modification I have used the character 27 to indicate a grain receiving hopper to which is attached a motor 28 driving the shaft 29 which drives a chain 30 which in turn drives the shaft 31 which drives the lengthened helical conveyor 32 which is placed within the lengthened tubular member 33 and is thereby adapted to convey the grain throughout this tubular member, and positioned at the side of the tubular member 33 are a series of equal diameter openings 34 which are placed progressively downwardly, as is shown in FIGURE 5, toward the rear end 35 of the tube 33. The tube 33 is made of a series of sections similar to those of the first embodiment clamped together by clamping bands 33a designed to hold said sections in proper relationship one to another. The character 33a indicates bands for joining sections of the tube 33.

In this modification, since the openings are placed progressively downwardly, the tendency will be for the grain to fall more readily at the rear of the tube due to the fact that the openings at this end are positioned further downwardly and as a result the bunk in which the unit is mounted will be fed uniformly throughout its length.

The tubular member 33 and the other parts are supported by means of the female tubes attached to the plates 37, with the male rods 38 being secured by means of the screws 39, and attached across the members 38 are the braces 40 upon which are journalled the small wheels 41, these wheels supporting the tubular unit, the screws 39 permitting adjustable positioning vertically of the unit.

Attached at the forward end of the tube 33 at 42 is a lever 43 which includes a suitable spring urged latching member 44 which engages the teeth 45, this arrangement permitting rotatable movement of the tube 33 for adjustment if desired and also providing means whereby the entire tube can be swung over so that the openings 34 will be at the bottom during winter or other conditions so that moisture will not gather in the tube 33.

FIGURES 9 and 10 illustrate a preferred modification of my invention of a bunk feeder in which identical characters will indicate identical parts, the unit being supported by means of the parts 36, 38, 41, etc. and the unit also having the same other parts such as the driving mechanism, hopper 27, etc. However, in this construction I employ a series of openings 46, 47, 48, 49 and 50, the openings 46 being circular, and the remaining openings 47, 48, 49 and 50 being oval and being progressively longer toward the rear of the tube 33, this arrangement being provided between the various supports 38. As shown in FIGURE 9 it will be noted that there are a series of several of these openings, each starting with the circular opening 46 and with the circular opening 46 in the second series being slightly lower than the opening 50 of the first series, each series dropping a small distance. The purpose of the gradually enlarged openings is to provide a uniform feeding of the material into the bunk in which the unit is supported since the larger openings will naturally permit more material to pass at these points to compensate for the gradually reducing conveying capacity of the conveyor 32, and the gradual dropping of each series a slight distance will also provide a more uniform filling toward the rear of the tube.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A bunk feeder comprising hopper means, a tubular carrying member extending from said hopper means and being in communication therewith, driven conveyor means in said tubular member and extending into said hopper means, said tubular member being formed to provide at least one series of side openings therein, including a first circular opening adjacent said hopper means, the successive openings being spaced apart longitudinally in said tubular member and each successive opening being formed to extend somewhat longer along the axis of the tube than the previous opening whereby the last opening in said series is the most oblong of said openings.

2. The feeder of claim 1 in which the tubular member has a plurality of the series of openings, the lower edge of the openings in any one series being arranged along a line substantially parallel to the axis of said tubular member, said edges of the series adjacent said hopper being at a higher level than those of successive series of openings, each successive series being arranged such that the line through said lower edges is successively lower on said tubular member as the distance from said hopper increases.

3. The device of claim 2 in which the tubular member is adjustable rotatably relative to said hopper, and means for rotatably adjusting said tubular member including a lever attached thereto.

4. The device of claim 3 in which the tubular member is supported on support means including a plurality of pairs of vertically adjustable posts, bars attached across said posts, and roller means attached to said bars and on which said tubular member rests.

References Cited in the file of this patent

UNITED STATES PATENTS

| | | |
|---|---|---|
| 2,350,476 | Richey | June 6, 1944 |
| 2,630,906 | Philipp | Mar. 10, 1953 |
| 2,867,314 | Hansen | Jan. 6, 1959 |

OTHER REFERENCES

Implement and Tractor, Sept. 7, 1957 issue (pages 80–81).